(12) United States Patent  
Yi et al.

(10) Patent No.: US 12,496,132 B2  
(45) Date of Patent: Dec. 16, 2025

(54) SYSTEM AND METHOD FOR DETERMINING A TARGET POINT FOR A NEEDLE BIOPSY

(71) Applicant: SHANGHAI UNITED IMAGING HEALTHCARE CO., LTD., Shanghai (CN)

(72) Inventors: Xingyue Yi, Shanghai (CN); Dongwei Chu, Shanghai (CN); Qifei Sun, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 834 days.

(21) Appl. No.: 17/172,083

(22) Filed: Feb. 10, 2021

(65) Prior Publication Data

US 2021/0196389 A1    Jul. 1, 2021

Related U.S. Application Data

(63) Continuation of application No. PCT/CN2019/101289, filed on Aug. 19, 2019.

(30) Foreign Application Priority Data

Aug. 27, 2018 (CN) .......................... 201810980808.9  
Aug. 27, 2018 (CN) .......................... 201810982328.6

(51) Int. Cl.  
*A61B 6/50* (2024.01)  
*A61B 6/00* (2006.01)  
(Continued)

(52) U.S. Cl.  
CPC .............. *A61B 34/10* (2016.02); *A61B 6/025* (2013.01); *A61B 6/502* (2013.01); *A61B 6/5211* (2013.01);  
(Continued)

(58) Field of Classification Search  
CPC ............ A61B 10/0041; A61B 10/0233; A61B 2034/105; A61B 2034/107;  
(Continued)

(56) References Cited

U.S. PATENT DOCUMENTS

2008/0089472 A1    4/2008   Yoon  
2012/0189092 A1    7/2012   Jerebko et al.  
(Continued)

FOREIGN PATENT DOCUMENTS

CN          1846615 A      10/2006  
CN        104224211 A      12/2014  
(Continued)

OTHER PUBLICATIONS

International Search Report in PCT/CN2019/101289 mailed on Nov. 20, 2019, 5 pages.

(Continued)

*Primary Examiner* — Christopher L Cook  
(74) *Attorney, Agent, or Firm* — METIS IP LLC

(57) ABSTRACT

A system and a method for determining a target point for a needle biopsy may be provided. The method may include obtaining a first localization image and a second localization image regarding a region of interest (ROI) of a subject. The method may include labelling a plurality of pairs of markers for the ROI on the first localization image and the second localization image. The method may include determining a space position of each of the plurality of pairs of markers. The method may include generating visualized data regarding the ROI based on the space positions of the plurality of pairs of markers, and determining the target point for the needle biopsy based on the visualized data.

17 Claims, 10 Drawing Sheets

(51) Int. Cl.
*A61B 6/02* (2006.01)
*A61B 10/00* (2006.01)
*A61B 10/02* (2006.01)
*A61B 34/10* (2016.01)
*G06V 20/69* (2022.01)
*G16H 30/40* (2018.01)

(52) U.S. Cl.
CPC .......... *A61B 6/563* (2013.01); *A61B 10/0041* (2013.01); *A61B 10/0233* (2013.01); *G06V 20/693* (2022.01); *G16H 30/40* (2018.01); *A61B 2034/105* (2016.02); *A61B 2034/107* (2016.02); *G06V 2201/032* (2022.01)

(58) Field of Classification Search
CPC ... A61B 2090/367; A61B 34/10; A61B 6/025; A61B 6/502; A61B 6/5211; A61B 6/563; G06T 19/00; G06T 2210/41; G06V 20/693; G06V 2201/032; G16H 30/40
See application file for complete search history.

(56) References Cited

U.S. PATENT DOCUMENTS

| | | | |
|---|---|---|---|
| 2013/0090553 A1* | 4/2013 | Maack | A61B 10/0233 600/424 |
| 2014/0033126 A1* | 1/2014 | Kreeger | G06T 11/003 715/833 |
| 2014/0213895 A1 | 7/2014 | Kuwabara et al. | |
| 2014/0348404 A1* | 11/2014 | Jerebko | A61B 6/5217 382/131 |
| 2015/0073298 A1* | 3/2015 | Finke | A61B 6/025 600/562 |
| 2016/0038248 A1* | 2/2016 | Bharadwaj | G06T 7/0012 715/771 |
| 2016/0089098 A1 | 3/2016 | Nakayama et al. | |
| 2016/0183887 A1* | 6/2016 | Toba | A61B 6/025 600/424 |
| 2018/0165840 A1* | 6/2018 | Bernard | A61B 34/10 |
| 2018/0322633 A1* | 11/2018 | Kuratomi | G06T 7/0012 |

FOREIGN PATENT DOCUMENTS

| | | |
|---|---|---|
| CN | 108805933 A | 11/2018 |
| CN | 109009187 A | 12/2018 |
| JP | 2010137004 A | 6/2010 |
| JP | 2013202058 A | 10/2013 |
| WO | 2012096221 A1 | 7/2012 |
| WO | 20120132303 A1 | 10/2012 |
| WO | 2014100950 A1 | 7/2014 |
| WO | 2015044711 A1 | 4/2015 |
| WO | WO 2018/055395 * | 9/2017 |

OTHER PUBLICATIONS

Written Opinion in PCT/CN2019/101289 mailed on Nov. 20, 2019, 5 pages.
The Extended European Search Report in European Application No. 19853597.3 mailed on Jul. 12, 2021, 11 pages.
Luo, Qingsheng et al., Bionic Quadruped Robot Technology, Beijing Institute of Technology Press, 2016, 6 pages.

* cited by examiner

600

```
┌─────────────────────────────────────────────┐
│ Obtaining a first localization image and a  │
│ second localization image regarding a       │──── 602
│ region of interest (ROI) of a subject       │
└─────────────────────────────────────────────┘
                      │
                      ▼
┌─────────────────────────────────────────────┐
│ Labelling a plurality of pairs of markers   │
│ for the ROI on the first localization image │──── 604
│ and the second localization image           │
└─────────────────────────────────────────────┘
                      │
                      ▼
┌─────────────────────────────────────────────┐
│ Determining a space position of each of the │──── 606
│ plurality of pairs of markers               │
└─────────────────────────────────────────────┘
                      │
                      ▼
┌─────────────────────────────────────────────┐
│ Generating visualized data regarding the    │
│ ROI based on the space positions of the     │──── 608
│ plurality of pairs of markers               │
└─────────────────────────────────────────────┘
                      │
                      ▼
┌─────────────────────────────────────────────┐
│ Determining a target point for the needle   │──── 610
│ biopsy based on the visualized data         │
└─────────────────────────────────────────────┘
```

┌─────────────────────────────────────────┐
│ Obtaining a first localization image and a second │ ~ 802
│ localization image regarding a region of interest (ROI) of a │
│ subject │
└─────────────────────────────────────────┘
                    ↓
┌─────────────────────────────────────────┐
│ Labelling a plurality of pairs of markers for the ROI on the │ ~ 804
│ first localization image and the second localization image │
└─────────────────────────────────────────┘
                    ↓
┌─────────────────────────────────────────┐
│ Determining a space position of each of the plurality of │ ~ 806
│ pairs of markers │
└─────────────────────────────────────────┘
                    ↓
┌─────────────────────────────────────────┐
│ Generating a 2D map based on the space positions of the │ ~ 808
│ plurality of pairs of markers │
└─────────────────────────────────────────┘
                    ↓
┌─────────────────────────────────────────┐
│ Determining a target point for the needle biopsy based on │ ~ 810
│ the 2D map │
└─────────────────────────────────────────┘

FIG. 8

SYSTEM AND METHOD FOR DETERMINING A TARGET POINT FOR A NEEDLE BIOPSY

CROSS-REFERENCE OF RELATED APPLICATIONS

This application is a continuation of International Patent Application No. PCT/CN2019/101289, filed on Aug. 19, 2019, which claims priority of Chinese Patent Application No. CN201810982328.6, filed on Aug. 27, 2018, and Chinese Patent Application No. CN201810980808.9, filed on Aug. 27, 2018, the contents of each of which are hereby incorporated by reference.

TECHNICAL FIELD

This disclosure generally relates to a medical diagnosis, and more particularly, to system and method for determining a target point for a needle biopsy in the medical diagnosis.

BACKGROUND

In some cases, a small lesion (e.g., its size is less than 10 mm) of a disease (e.g., a breast disease) may not accurate diagnosis by a typical imaging device (e.g., a computed tomography (CT) device). To diagnose such a small lesion accurately, a needle biopsy is widely adopted in clinical applications. The needle biopsy is a procedure that extracts sample cells or tissues of a suspected lesion region for examination to determine the presence or extent of the disease. It is important for the needle biopsy to determine a sampling location of the sample cells or tissues. If the sampling location is not within the lesion region, the taken sample cells or tissues can't be used to examine the disease. In such a case, the disease may not be accurately diagnosed. Therefore, it is desirable to develop a system and a method for accurately determining a target point for extracting sample cells or tissues of the suspected lesion region.

SUMMARY

In a first aspect of the present disclosure, a method for determining a target point for a needle biopsy is provided. The method may be implemented on a computing device including at least one processor and at least one storage device. The method may include one or more of the following operations. The method may include obtaining a first localization image and a second localization image regarding a region of interest (ROI) of a subject. The method may include labelling a plurality of pairs of markers for the ROI on the first localization image and the second localization image. A first marker of the pair of markers may correspond to the first localization image and a second marker of the pair of markers may correspond to the second localization image. The method may include determining a space position of each of the plurality of pairs of markers. The method may include generating visualized data regarding the ROI based on the space positions of the plurality of pairs of markers. The method may further include determining the target point for the needle biopsy based on the visualized data.

In some embodiments, the visualized data may be represented by a three-dimensional (3D) model.

In some embodiments, the method may further include displaying the space positions of the plurality of pairs of markers on the 3D model.

In some embodiments, the first localization image and the second localization image may be two-dimensional (2D) images corresponding to a first dimension and a second dimension, and the visualized data may be represented by a 2D map corresponding to a third dimension and the first dimension, or corresponding to the third dimension and the second dimension.

In some embodiments, the first localization image may be acquired at a first acquisition angle by an imaging device. The second localization image may be acquired at a second acquisition angle by the imaging device. The first acquisition angle and the second acquisition angle may have an equal absolute deflection angle value but opposite deflection directions from a reference location.

In some embodiments, before acquiring the first localization image and the second localization image, the method may further include obtaining an initial localization image at an initial acquisition angle using the imaging device, and determining whether the ROI is within an imaging range of the imaging device.

In some embodiments, a first difference between the initial acquisition angle and the first acquisition angle may be equal to a second difference between the initial acquisition angle and the second acquisition angle.

In some embodiments, the method may further include determining one or more candidate points based on the visualized data, and selecting the target point from the one or more candidate points.

In some embodiments, the imaging device may include a radiation source for emitting radiation beams. The method may include obtaining a first coordinate and a second coordinate of the radiation source corresponding to the first localization image and the second localization image, respectively. The method may include obtaining image coordinates of each of the plurality of pairs of markers on the first localization image and the second localization image. The method may further include determining, based on the first coordinate, the second coordinate and the images coordinates, the space position of each of the plurality of pairs of markers.

In some embodiments, the ROI may include a mammary region of the subject.

In a second aspect of the present disclosure, a system for determining a target point for a needle biopsy is provided. The system may include at least one storage device and at least one processor. The at least one storage device may store a set of instructions. The at least one processor may communicate with the at least one storage device. When executing the set of instructions, the at least one processor may cause the system to perform one or more of the following operations. The system may obtain, via an imaging device, a first localization image and a second localization image regarding a region of interest (ROI) of a subject. The system may label a plurality of pairs of markers for the ROI on the first localization image and the second localization image. A first marker of the pair of markers may correspond to the first localization image and a second marker of the pair of markers may correspond to the second localization image. The system may determine a space position of each of the plurality of pairs of markers. The system may generate visualized data regarding the ROI based on the space positions of the plurality of pairs of markers. The system may determine the target point for the needle biopsy based on the visualized data.

In a third aspect of the present disclosure, a non-transitory computer readable medium may be provided. The non-transitory computer readable medium may include at least one set of instructions that, when executed by at least one processor, cause a computing device to effectuate a method. The method may include one or more of the following operations. The method may include obtaining a first localization image and a second localization image regarding a region of interest (ROI) of a subject. The method may include labelling a plurality of pairs of markers for the ROI on the first localization image and the second localization image. A first marker of the pair of markers may correspond to the first localization image and a second marker of the pair of markers may correspond to the second localization image. The method may include determining a space position of each of the plurality of pairs of markers. The method may include generating visualized data regarding the ROI based on the space positions of the plurality of pairs of markers. The method may further include determining the target point for the needle biopsy based on the visualized data.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6 is a flowchart illustrating an exemplary process for determining a target point for a needle biopsy according to some embodiments of the present disclosure;

FIG. 8 is a flowchart illustrating an exemplary process for determining a target point for a needle biopsy according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by another expression if they may achieve the same purpose.

Figure 3:
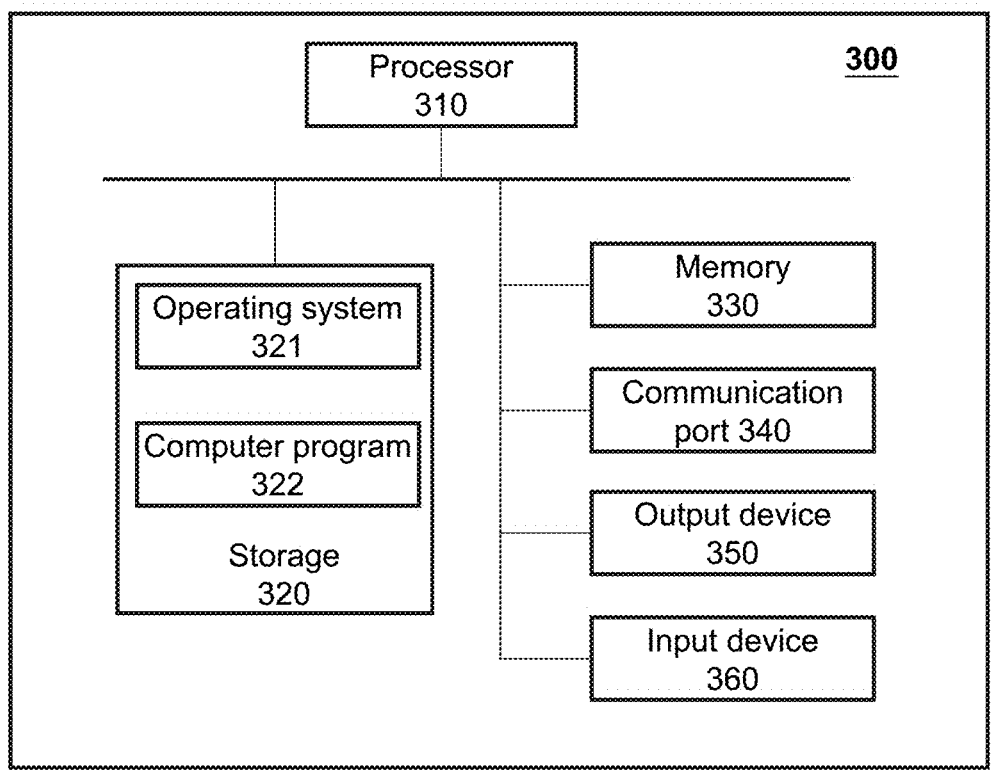
FIG. 3 is a schematic diagram illustrating exemplary hardware and/or software components of a computing device on which the processing device may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 310 as illustrated in FIG. 3) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an Erasable Programmable Read Only Memory (EPROM). It will be further appreciated that hardware modules/units/ blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for medical imaging and/or medical treatment. In some embodiments, the medical system may include an imaging system. The imaging system may include a single modality imaging system and/or a multi-modality imaging system. The single modality imaging system may include, for example, a digital mammography (DM) system, a full-field digital mammography (FFDM) system, a digital breast tomosynthesis (DBT) system, an X-ray radiography system. The X-ray radiography system may include a computed tomography (CT) device, a digital radiography (DR) device, a C-arm X-ray device, and so on. The multi-modality imaging system may include, for example, a computed tomography-magnetic resonance imaging (MRI-CT) system, a computed tomography-a positron emission tomography imaging (PET-CT) system, etc. In some embodiments, the medical system may include a treatment system. The treatment system may include a treatment plan system (TPS), image-guide radiotherapy (IGRT), etc. The image-guide radiotherapy (IGRT) may include a treatment device and an imaging device. The treatment device may include a linear accelerator, a cyclotron, a synchrotron, etc., configured to perform a radiotherapy on a subject. The treatment device may include an accelerator of species of particles including, for example, photons, electrons, protons, or heavy ions. The imaging device may include an MRI scanner, a CT scanner (e.g., cone beam computed tomography (CBCT) scanner), a digital radiology (DR) scanner, an electronic portal imaging device (EPID), etc.

Figure 1:
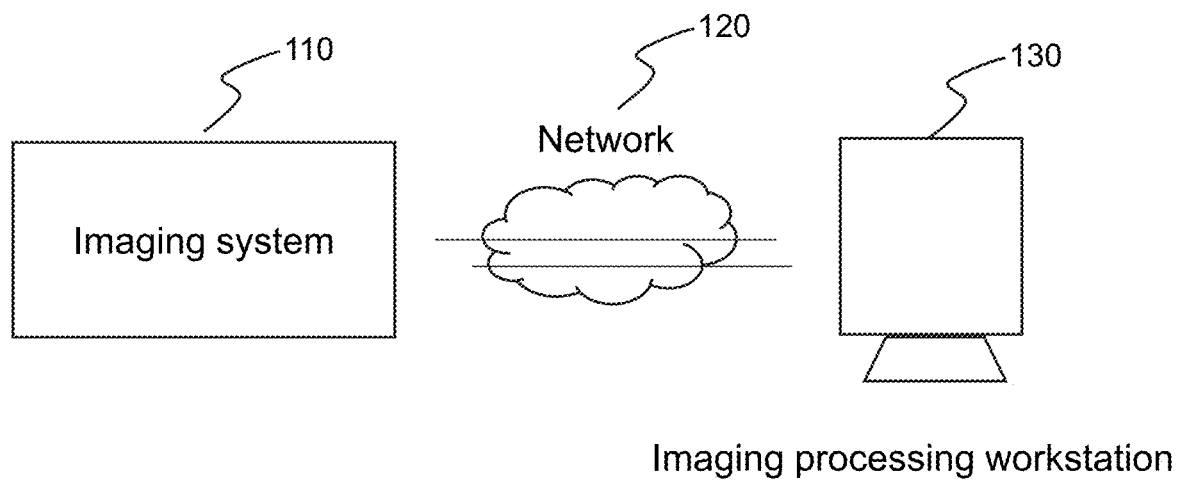
FIG. 1 is a schematic diagram illustrating an exemplary imaging system according to some embodiments of the present disclosure.

FIG. 1 is a schematic diagram illustrating an exemplary medical system according to some embodiments of the present disclosure. As shown in FIG. 1, medical system 100 may include an imaging system 110 and an imaging processing workstation 130. The imaging system 110 may connect to the imaging processing workstation 130 via network 120.

The image processing workstation 130 may communicate with one or more components of the imaging system 110 system via a wired or wireless network. In some embodiments, the imaging system 110 may be an X-ray radiography system for diagnosing a region of interest (ROI) of a subject. Mere by way of example, the subject may be a patient. The ROI of the subject may include a specific portion, organ, and/or tissue of a patient. For example, the ROI may include mammary, head, brain, neck, body, shoulder, arm, thorax, cardiac, stomach, blood vessel, soft tissue, knee, feet, or the like, or any combination thereof.

Merely for illustration, the imaging system 110 may be an X-ray mammography system for diagnosing the mammary region. In some embodiments, the X-ray mammography system may include a positioning component for positioning a target point for a needle biopsy. A needle biopsy device may be used to take a biopsy sample (e.g., mammary lesion related tissues) from the ROI region (e.g., a suspected lesion region) corresponding to the target point. The biopsy sample may be further examined to determine whether the lesion tissues exist. In some embodiments, the positioning component may include an X-ray digital mammography positioning device, an ultrasound mammography positioning device, a magnetic resonance (MR) mammography positioning device, or the like, or any combination thereof. In some embodiments, the X-ray mammography system may generate encoded image information by scanning the ROI of the subject. The encoded image information may be recorded by an image plate. The image processing workstation 130 may decode the image information to generate one or more digital images. The one or more digital images may be displayed via a display of the imaging processing workstation 130. In some embodiments, the positioning component of the X-ray mammography system may determine the target point for the needle biopsy based on the one or more digital images. In some embodiments, the imaging processing workstation 130 may be a compute electronic device (e.g., computing device 300 shown in FIG. 3) configured to process the one or more digital images.

Figure 2:
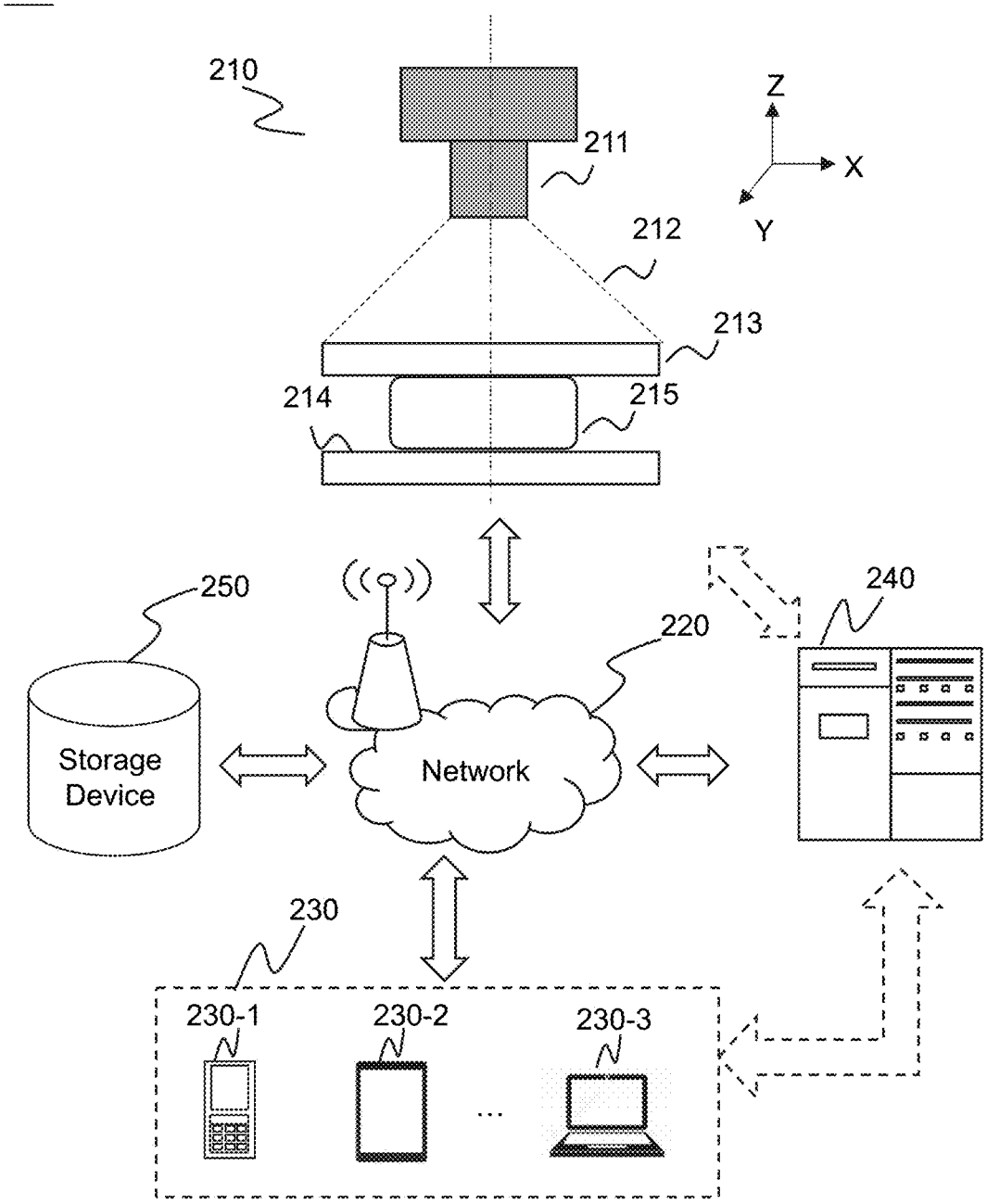
FIG. 2 is a schematic diagram illustrating an exemplary imaging system according to some embodiments of the present disclosure.

FIG. 2 is a schematic diagram illustrating an exemplary imaging system according to some embodiments of the present disclosure. In some embodiments, imaging system 200 may be the same as or similar to the imaging system 100 shown in FIG. 1. As shown in FIG. 2, the imaging system 200 may include an imaging device 210, a network 220, one or more terminal devices 230, a processing device 240, and a storage device 250. The components in the imaging system 200 may be connected in one or more of various ways. Merely by way of example, as shown in FIG. 2, the imaging device 210 may be connected to the processing device 240 through the network 220. As another example, the imaging device 210 may be connected to the processing device 240 directly as indicated by the bi-directional arrow in dotted lines linking the imaging device 210 and the processing device 240. As a further example, the storage device 250 may be connected to the processing device 240 directly or through the network 220. As still a further example, one or more terminal devices 230 may be connected to the processing device 240 directly (as indicated by the bi-directional arrow in dotted lines linking the terminal device 240 and the processing device 240) or through the network 220.

The imaging device 210 may include a computed tomography (CT) device, a digital radiography (DR) device, an X-ray mammography device, or the like, or any combination thereof. As used herein, the X-ray mammography device may be designated as the imaging device 210. The imaging device 210 may include a radiation source (e.g., an X-ray tube) 211, an adjustable compression plate 213 and a detector 214.

In some embodiments, the radiation source 211, the compression plate 213 and the detector 214 may be mounted on a gantry (not shown in FIG. 2). The detector 214 and the radiation source 211 may be oppositely mounted on the gantry. The compression plate 213 may be disposed between the radiation source 211 and the detector 214. The compression plate 213 may compress and immobilize a mammary gland 215 to be examined. The mammary gland 215 may be compressed to form thin and uniform shape. In some embodiments, if the compressed mammary gland is thinner, an image contrast of the mammary gland is higher. Thus, the mammary gland 215 may be compressed to a relative thin shape in order to be imaged better.

The radiation source 211 may emit radiation rays 212 to irradiate the compressed mammary gland 215. The radiation rays may include X-rays, γ-rays, α-rays, ultraviolet, laser, neutron, proton, or the like, or a combination thereof. Typical radiation source 211 may be an X-ray generator for emitting X-rays. The detector 214 may receive the radiation rays passed through the compressed mammary gland 215. In some embodiments, the detector 214 may include a plurality of detector units, which may be arranged in a channel direction and a row direction. The detector 214 may include a scintillation detector (e.g., a cesium iodide detector) or a gas detector.

In some embodiments, the subject (e.g., a patient) may place her/his mammary gland over the detector 214. The bottom surface of the compression plate 213 may closely attach to the mammary gland. In some embodiments, a driving device (not shown in FIG. 2) may drive the compression plate 213 to compress the mammary gland to a certain compression state. Under the compression state, the mammary gland is thin enough. The radiation rays may traverse the compression plate 213 and the compressed mammary gland. Then the detector 214 may receive the traversed radiation rays. One or more mammary images may be reconstructed according to the received data.

The network 220 may facilitate exchange of information and/or data. In some embodiments, one or more components of the imaging system 200 (e.g., the imaging device 210, the one or more terminal devices 230, the processing device 240, or the storage device 250) may send information and/or data to another component(s) in the imaging system 200 via the network 220. For example, the processing device 240 may obtain, via the network 220, one or more localization images from the storage device 250. In some embodiments, the network 220 may be any type of wired or wireless network, or combination thereof. The network 220 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 220 may include one or more network access points. For example, the network 220 may include wired or wireless network access points such as base stations and/or internet exchange points through which one or more components of the imaging system 200 may be connected to the network 220 to exchange data and/or information.

In some embodiments, a user (e.g., an operator or a doctor) may control the imaging system 200 to perform one or more operations through the one or more terminal devices 230. The one or more terminal devices 230 include a mobile device 230-1, a tablet computer 230-2, a laptop computer 230-3, or the like, or any combination thereof. In some embodiments, the mobile device 230-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, the terminal device 230 may remotely operate the imaging device 210. In some embodiments, the terminal device 230 may operate the imaging device 210 via a wireless connection. In some embodiments, the terminal device 230 may receive information and/or instructions inputted by a user, and send the received information and/or instructions to the imaging device 210 or to the processing device 240 via the network 220. In some embodiments, the terminal device 230 may receive data and/or information from the processing device 240. In some embodiments, the terminal device 230 may be part of the processing device 240. In some embodiments, the terminal device 230 may be omitted.

The processing device 240 may process data obtained from the imaging device 210, the one or more terminal devices 230, or the storage device 250. For example, the processing device 240 may obtain a first localization image and a second localization image regarding a region of interest (ROI) of a subject (e.g., a mammary region). As another example, the processing device 240 may label a plurality of pairs of markers for the ROI on the first localization image and the second localization image. As a further example, the processing device 240 may generate visualized data regarding the ROI based on the labelled plurality of pairs of markers. The processing device 240 may be a central processing unit (CPU), a digital signal processor (DSP), a system on a chip (SoC), a microcontroller unit (MCU), or the like, or any combination thereof.

In some embodiments, the processing device 240 may be a single server or a server group. The server group may be centralized or distributed. In some embodiments, the processing device 240 may be local or remote. For example, the processing device 240 may access information and/or data stored in the imaging device 210, the terminal device 2130, and/or the storage device 250 via the network 220. As another example, the processing device 240 may be directly connected to the imaging device 210, the terminal device 2130, and/or the storage device 250, to access stored information and/or data. In some embodiments, the processing device 240 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 240 may be implemented on a computing device 300 having one or more components illustrated in FIG. 3 in the present disclosure.

The storage device 250 may store data and/or instructions. In some embodiments, the storage device 250 may store data obtained from the imaging device 210, the terminal device 230 and/or the processing device 240. For example, the storage device 250 may store one or more images obtained from the processing device 240. In some embodiments, the storage device 250 may store data and/or instructions that the processing device 240 may execute or use to perform exemplary methods described in the present disclosure. For example, the storage device 250 may store data and/or instructions that the processing device 240 may execute or use to determine a target point for a needle biopsy. In some embodiments, the storage device 250 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 250 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 250 may be connected to the network 220 to communicate with one or more components of the imaging system 200 (e.g., the one or more terminal devices 230, or the processing device 240). One or more components of the imaging system 200 may access the data or instructions stored in the storage device 250 via the network 220. In some embodiments, the storage device 250 may be directly connected to or communicate with one or more components of the imaging system 200 (e.g., the one or more terminal devices 230, or the processing device 240). In some embodiments, the storage device 250 may be part of the processing device 240.

FIG. 3 is a schematic diagram illustrating exemplary hardware and/or software components of a computing device on which the processing device may be implemented according to some embodiments of the present disclosure.

As illustrated in FIG. 3, computing device 300 may include a processor 310, a storage medium 320, a memory 330, a communication port 340, an output device 350 and an input device 360. In some embodiments, the image processing workstation 130, the processing device 240 and/or the one or more terminal devices 230 may be implemented on the computing device 300.

The processor 310 may execute computer programs (e.g., computer program 322 stored in a storage 320) and, when executing the computer programs, cause the processing device 240 to perform functions of the processing device 240 in accordance with techniques described herein. The computer programs may include, for example, routines, programs, objects, components, signals, data structures, procedures, modules, and functions, which perform particular functions described herein. The computer programs may be stored in the storage 320. The storage 320 may also store an operating system 321 (e.g., Linux, Microsoft windows, mac OS, etc.). The operating system 321 may be loaded into the memory 330 from the storage 320 in order to be executed by the processor 310.

The processor 310 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. The storage 320 and/or the memory 330 may be a storage device similar to or same as the storage device 250 illustrated in FIG. 2.

The communication port 340 may be connected to a network (e.g., the network 220) to facilitate data communications. For example, in the imaging system 200, the communication port 340 may establish connections between the processing device 240 and the imaging device 210, the one or more terminal devices 230, or the storage device 250. The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMAX, WLAN, ZigBee, mobile network (e.g., 3G, 4G, 5G, etc.), or the like, or a combination thereof. In some embodiments, the communication port 240 may be a standardized communication port, such as RS232, RS485, etc. In some embodiments, the communication port 340 may be a specially designed communication port. For example, the communication port 340 may be designed in accordance with the digital imaging and communications in medicine (DICOM) protocol.

In some embodiments, the input device 360 and the output device 350 may enable user interaction with the processing device 240. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

Merely for illustration, only one processor is described in the computing device 300. However, it should be noted that the computing device 300 in the present disclosure may also include multiple processors. Thus operations and/or method steps that are performed by one processor as described in the present disclosure may also be jointly or separately performed by the multiple processors. For example, if in the present disclosure the processor of the computing device 300 executes both operation A and operation B, it should be understood that operation A and operation B may also be performed by two or more different processors jointly or separately in the computing device 300 (e.g., a first processor executes operation A and a second processor executes operation B, or the first and second processors jointly execute operations A and B).

Figure 4:
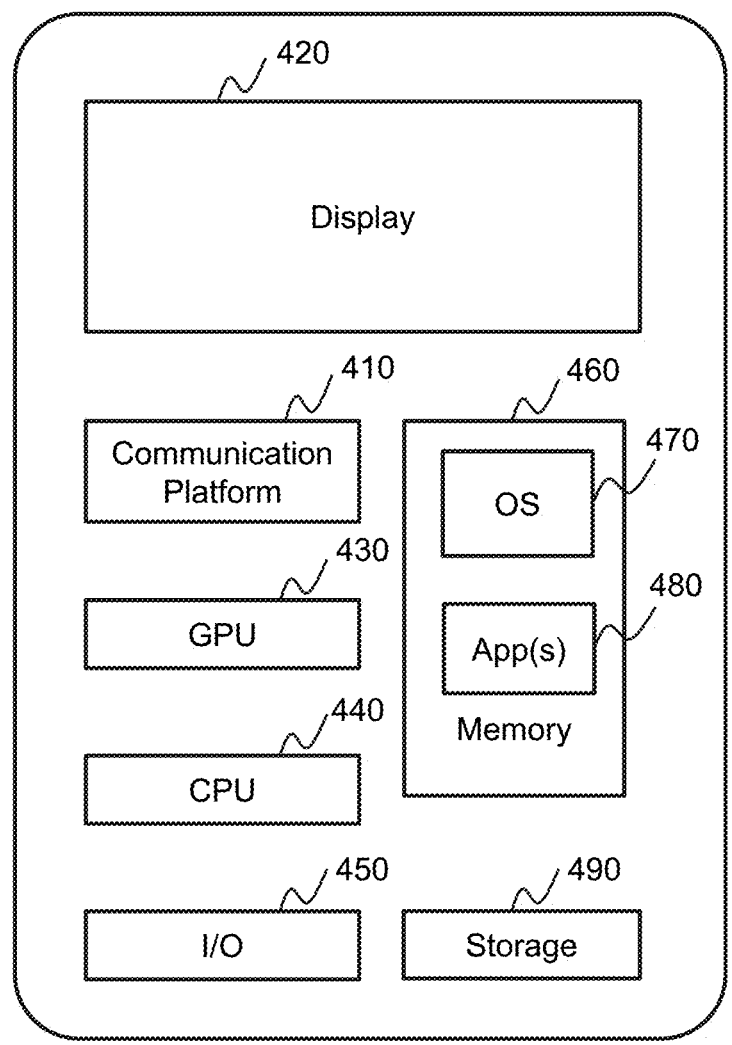
FIG. 4 is a schematic diagram illustrating exemplary hardware and/or software components of a mobile device on which a terminal device according to some embodiments of the present disclosure.

FIG. 4 is a schematic diagram illustrating exemplary hardware and/or software components of a mobile device on which a terminal device may be implemented according to some embodiments of the present disclosure. As illustrated in FIG. 4, mobile device 400 may include a communication platform 410, a display 420, a graphic processing unit (GPU) 430, a central processing unit (CPU) 440, an I/O 450, a memory 460, and a storage 490. In some embodiments, any other suitable component, including but not limited to a system bus or a controller (not shown), may also be included in the mobile device 400. In some embodiments, a mobile operating system 470 (e.g., iOS, Android, Windows Phone, etc.) and one or more applications 480 may be loaded into the memory 460 from the storage 490 in order to be executed by the CPU 440. The applications 480 may include a browser or any other suitable mobile apps for receiving and rendering information relating to image processing or other information from the processing device 140. User interactions with the information stream may be achieved via the I/O 450 and provided to the processing device 140 and/or other components of the MRI system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate and track shapes of a target as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 5:
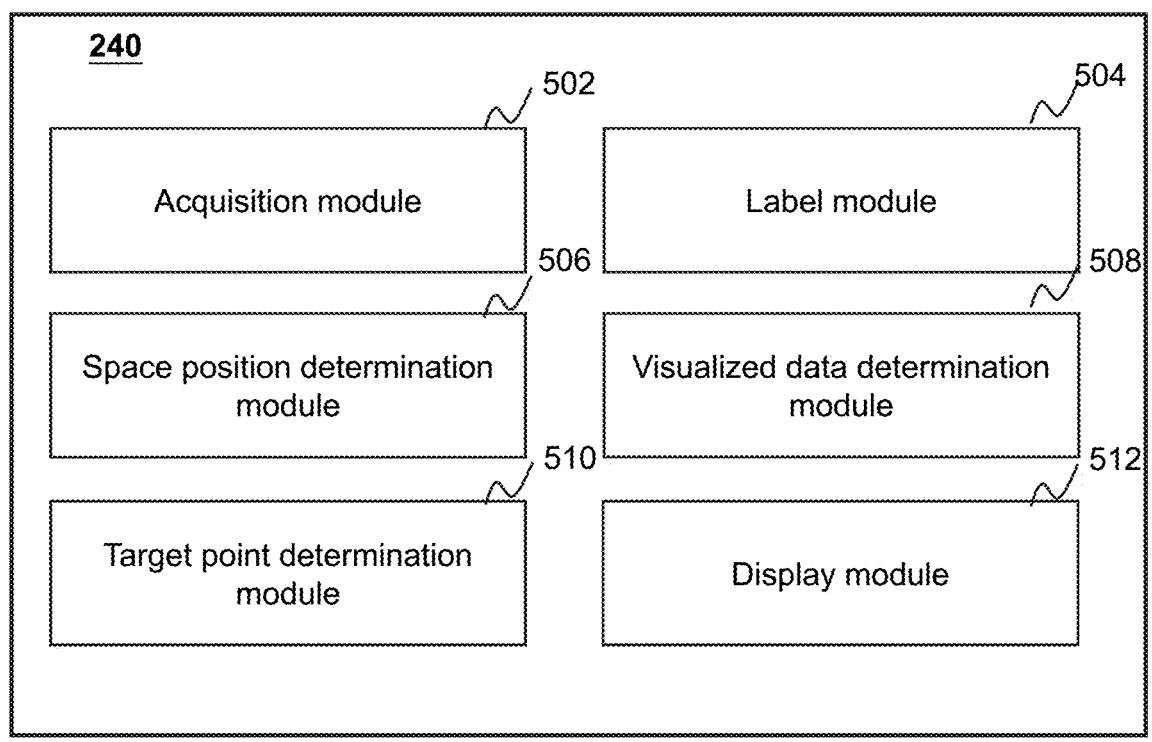
FIG. 5 is a block diagram illustrating an exemplary processing device according to some embodiments of the present disclosure.

FIG. 5 is a block diagram illustrating an exemplary processing device according to some embodiments of the present disclosure. The processing device 240 may include an acquisition module 502, a label module 504, a space position determination module 506, a visualized data determination module 508, a target point determination module 510 and a display module 512. At least a portion of the processing device 240 may be implemented on a computing device as illustrated in FIG. 3 or a mobile device as illustrated in FIG. 4. In some embodiments, one or more modules of the processing device 240 may also be implemented to a position component of the imaging system 110 (e.g., the X-ray mammography system).

The acquisition module 502 may acquire data or instructions from the imaging system 200. In some embodiments, the acquisition module 502 may obtain a first localization image and a second localization image regarding a region of interest (ROI) of a subject. In some embodiments, the subject may be a patient. The ROI of the subject may refer to a suspected lesion region of the patient, such as a mammary region of the subject. In some embodiments, the first localization image and the second localization image may be generated by the imaging device 210. The imaging device 210 may generate the first localization image at a first acquisition angle, and generate the second localization image at a second acquisition angle. In some embodiments, the first acquisition angle (e.g., +15°) and the second localization angle (e.g., −15°) may have equal absolute deflection angle value but opposite deflection directions from a reference location (e.g., a location corresponding to 0°). In some embodiments, the reference location may refer to an initial location of a radiation source 211 of the imaging device 210.

The label module 504 may label a plurality of pairs of markers for the ROI on the first localization image and the second localization image. For each pair of markers, a first marker of the pair of markers may correspond to the first localization image and a second marker of the pair of markers may correspond to the second localization image. In some embodiments, the first marker and the second marker may be labelled on the same point (e.g., a suspected lesion point) of the ROI of the first localization image and the second localization image, respectively. The first marker and the second marker may correspond to a common space position of the same point of the ROI.

The space position determination module 506 may determine a space position of each of the plurality of pairs of markers. In some embodiments, the space position determination module 506 may obtain a first coordinate of the radiation source corresponding to the first localization image, and obtain a second coordinate of the radiation source corresponding to the second localization image. The space position determination module 506 may obtain image coordinates of each of the plurality of pairs of markers on the first localization image and the second localization image. The space position determination module 506 may determine, based on the first coordinate, the second coordinate and the images coordinates, the space position of each of the plurality of pairs of markers by using a four-point connection-based localization algorithm. In some embodiments, the image coordinates of the markers may be associated with projection coordinates of the markers on the detector.

The visualized data determination module 508 may generate visualized data regarding the ROI based on the space positions of the plurality of pairs of markers. In some embodiments, the visualized data may be a three-dimensional (3D) model or a two-dimensional (2D) map. In some embodiments, the 2D map may include position information of the suspected lesion point corresponding to the pair of markers at two dimensions. In some embodiments, if the first localization image and the second localization image are the 2D planar image corresponding to a first dimension and a second dimension, the two dimensions of the 2D map may include a third dimension and the first dimension, or the third dimension and the second dimension.

Merely by way of example, if the first localization image and the second localization image are the images of the X-Y coordinate plane, the coordinate of Z direction may represent the position of the third dimension of the 2D map. The 2D map may be the image of the X-Z coordinate plane or the Y-Z coordinate plane. If the first localization image and the second localization image are the images of the X-Z coordinate plane, the coordinate of Y direction may represent the position of the third dimension of the 2D map. The 2D map may be the image of the X-Y coordinate plane or the Y-Z coordinate plane. If the first localization image and the second localization image are the images of the Y-Z coordinate plane, the coordinate of X direction may represent the position of the third dimension of the 2D map. The 2D map may be the image of the X-Y coordinate plane or the X-Z coordinate plane.

The target point determination module 510 may determine the target point for the needle biopsy based on the visualized data. For example, the target point determination module 510 may determine one or more candidate points based on the 3D model or the 2D map. The target point determination module 510 may select the target point from the one or more candidate points. The target point may be designated as a sampling location of the needle biopsy. At the location of the target point, some sample cells or tissues may be extracted by the needle biopsy device. The target point for the needle biopsy may be accurately determined based on the 3D model or the 2D map, which may improve the diagnosis efficiency for some diseases (e.g., the breast disease). More descriptions of the determination of the target point may be found elsewhere in the present disclosure (e.g., FIGS. 6-8, and the descriptions thereof).

The display module 512 may display data/information of the imaging system 200. In some embodiments, the display module 512 may display the 3D model and the 2D map. The display module 512 may display the space positions on the 3D model. The display module 512 may display the target point on the 3D model or the 2D map.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 240 may further include a storage module (not shown in FIG. 5). The storage module may be configured to store data generated during any process performed by any component of in the processing device 240. As another example, each of components of the processing device 240 may include a storage device. Additionally or alternatively, the components of the processing device 240 may share a common storage device.

FIG. 6 is a flowchart illustrating an exemplary process for determining a target point for a needle biopsy according to some embodiments of the present disclosure. In some embodiments, process 600 may be implemented in medical system 100 illustrated in FIG. 1 and/or the imaging system 200 illustrated in FIG. 2. For example, the process 600 may be stored in a storage device (e.g., the storage device 250, or the storage 320) as a form of instructions, and can be invoked and/or executed by the processing device 240 (e.g., the processor 310 of the computing device 300, or one or more modules in the processing device 240 illustrated in FIG. 5). The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 602, the processing device (e.g., the acquisition module 502 of the processing device 240) may obtain a first localization image and a second localization image regarding a region of interest (ROI) of a subject. For example, the acquisition module 502 may obtain the first localization image and the second localization image acquired by an imaging device (e.g., the imaging device 210). The imaging device 210 may be the X-ray mammary device.

In some embodiments, the subject may be a patient. The ROI of the subject may refer to a suspected lesion region of the patient, such as a mammary region of the subject. In some embodiments, the first localization image and the second localization image may be generated by the imaging device 210. The imaging device 210 may generate the first localization image at a first acquisition angle, and generate the second localization image at a second acquisition angle. In some embodiments, the first acquisition angle (e.g., +15°) and the second localization angle (e.g., −15°) may have equal absolute deflection angle value but opposite deflection directions from a reference location (e.g., a location corresponding to 0°). In some embodiments, the reference location may refer to an initial location of a radiation source 211 of the imaging device 210.

Typical radiation source 211 may be mounted on the gantry (not shown in FIG. 2), which may be driven by the imaging device 210 to rotate or translate. The gantry carries the radiation source to move to different locations for imaging (e.g., acquiring the first localization image at the first acquisition angle and acquiring the second localization image at the second acquisition angle), while the detector 214 remains in place. In some embodiments, before imaging, the radiation source mounted on the gantry may be set at the initial location, e.g., zero degree (0°), as the origin of a coordinate system of gantry. In this way, when one pair of markers for the ROI are labeled on the first localization image and the second localization image, respectively, the relative positions of the pair of labeled markers to the gantry is known since the relative position of the detector to the gantry is known. When the radiation source 211 is at the initial location, a center of the emitted radiation beams may be perpendicular to the detector 214. For example, as shown in FIG. 2, the initial location may be the position where the radiation source 211 and the detector 214 are coaxial, and separated from the compression plate 213 by a certain distance (e.g., 30 cm, 40 cm, 50 cm, 60 cm, etc.). The radiation source 211 may also be coaxial to the compression plate 213 at the initial location. It should be noted that the initial location may be set according to different scenarios. For example, the initial location may be set as a location of a non-zero angle in the coordinate system of the gantry, such as, +10°, +20°, −10°, or −20°, and so on.

Merely by way of example, the location of the gantry, e.g., at zero degree may be referred as the reference location for determining the relative positions of the pair of labeled markers to the gantry, as discussed above and elaborated further below. In some embodiments, the radiation source 211 may be moved to a location corresponding to the first acquisition angle. For example, the first acquisition angle is a positive 15° (i.e., +15°) deflected from the reference location. At the first acquisition angle, the radiation source 211 may emit the radiation beams to irradiate the suspected lesion region (e.g., the mammary region). The detector 214 may detect signals associated with the radiation beams. The first localization image may be generated by processing the detected signals. The first localization image may include image information indicative of the suspect lesion region at the first acquisition angle. In some embodiments, the radiation source 211 may be adjusted to a location corresponding to the second acquisition angle. For example, the second acquisition angle is a negative 15° (i.e., −15°) deflected from the reference location. At the second acquisition angle, the radiation source 211 may emit the radiation beams to irradiate the same suspected lesion region (e.g., the mammary region). The second localization image may be generated by processing the detected signals associated with the radiation beams. The second localization image may include image information indicative of the same suspect lesion region at the second acquisition angle. In some embodiments, the gantry may be driven to carry the radiation source 211 to move to the location of the first acquisition angle or the second acquisition angle, and the detector 214 may remain in place with the subject as set forth above.

As used herein, the "positive angle" and "negative angle" may denote a deflection angle at different directions, such as two opposite directions. For example, a first deflection angle along a first direction may be preset as the position angle (e.g.,+15°), and a second deflection angle along a second direction may be preset as the negative angle (e.g., −15°). The first direction and the second direction may be opposite directions. For example, the first direction refers to a clockwise direction, thus the second direction refers to an anti-clockwise direction. The gantry (or the radiation source 211) may rotate in the clockwise direction (i.e., the first direction) or in the anti-clockwise direction (i.e., the second direction). In some embodiments, the anti-clockwise direction may be designated to as the first direction, and the clockwise direction may be designated to as the first direction may be designated as the second direction. It is understood that the first direction and the second direction may not be intended to be limited.

In some embodiments, the first localization image and the second localization image may be two-dimensional (2D) planar images. For example, the first localization image and the second localization image may be images generated at the X-Y coordinate plane. As another example, the first localization image and the second localization image may be images generated at the Y-Z coordinate plane. As a further example, the first localization image and the second localization image may be images generated at the X-Z coordinate plane.

In some embodiments, before acquiring the first localization image and the second localization image, the precession device may obtain an initial localization image. Specifically, the imaging device 210 may generate the initial localization image at an initial acquisition angle. The radiation source 211 may be disposed at the initial acquisition angle. The acquisition module 502 may obtain the initial localization image from the imaging device 210.

In some embodiments, the processing device may determine whether the ROI is within an imaging range of the imaging device based on the initial localization image. In some embodiments, a first difference between the initial acquisition angle and the first acquisition angle may be equal to a second difference between the initial acquisition angle and the second acquisition angle. For example, the initial acquisition angle may be the angle corresponding to the reference location, such as 0°. The first difference and the second difference may be 15°. In some embodiments, if the ROI is not imaged in the initial localization image, the processing device may determine the ROI is not in the image region of the imaging device. In this case, the compression plate 213 need to be adjusted so as to make the ROI is within the imaging region of the imaging device, which may improve imaging efficiency of the imaging device 210 to some extent.

In 604, the processing device (e.g., the label module 504 of the processing device 240) may label a plurality of pairs of markers for the ROI on the first localization image and the second localization image. For each pair of markers, a first marker of the pair of markers may correspond to the first localization image and a second marker of the pair of markers may correspond to the second localization image. In some embodiments, the first marker and the second marker may be labelled on the same point (e.g., a suspected lesion point) of the ROI of the first localization image and the second localization image, respectively. The first marker and the second marker may correspond to a common space position of the same point of the ROI.

Merely by way of example, the label module 504 may determine the first markers for the ROI region (e.g., the mammary region) on the first localization image, and the second markers (e.g., the mammary region) for the ROI region on the second localization image. A pair of markers may include the first marker and the second marker. The label module 504 may record the pairs of the labeled markers, such as coordinates. In some embodiments, the marker may be a point on the ROI of the localization image. In some embodiments, the marker may be a plane on the ROI of the localization image. The shape of the marker may be not intended to be limited.

In 606, the processing device (e.g., the space position determination module 506 of the processing device 240) may determine a space position of each of the plurality of pairs of markers. In some embodiments, the processing device may determine the space position of each of the plurality of pairs of markers using a 3D localization algorithm (e.g., a four-point connection-based localization algorithm). In some embodiments, the space position may be designated as the space position of the suspected lesion point.

In some embodiments, the processing device may obtain a first coordinate of the radiation source corresponding to the first localization image, and obtain a second coordinate of the radiation source corresponding to the second localization image. The processing device may obtain image coordinates of each of the plurality of pairs of markers on the first localization image and the second localization image. The processing device may determine, based on the first coordinate, the second coordinate and the images coordinates, the space position of each of the plurality of pairs of markers by using a four-point connection-based localization algorithm. In some embodiments, the image coordinates of the markers may be associated with projection coordinates of the markers on the detector.

Merely by way of example, the space position determination module 506 may obtain, from the storage device 250, the first coordinate of the radiation source when acquiring the first localization image, and the second coordinate of the radiation source when acquiring the second localization image. The first coordinate may be the coordinate of the radiation source at the first acquisition angle (e.g., +15°), and the second coordinate may be the coordinate of the radiation source at the second acquisition angle (e.g., −15°). The space position determination module 506 may obtain, from the storage device 250, the image coordinates of each marker on its localization image. The space position determination module 506 may determine, based on the first coordinate, the second coordinate and the image coordinate, the space position of the each marker using one or more 3D localization algorithms (e.g., a layered approach, a gridding algorithm, a four-point connection-based localization algorithm).

In 608, the processing device (e.g., the visualized data determination module 508 of the processing device 240) may generate visualized data regarding the ROI based on the space positions of the plurality of pairs of markers. In some embodiments, the visualized data may be a three-dimensional (3D) model or a two-dimensional (2D) map. In some embodiments, the 2D map may include position information of the suspected lesion point corresponding to the pair of markers at two dimensions. In some embodiments, if the first localization image and the second localization image are the 2D planar image corresponding to a first dimension and a second dimension, the two dimensions of the 2D map may include a third dimension and the first dimension, or the third dimension and the second dimension. Merely by way of example, if the first localization image and the second localization image are the images of the X-Y coordinate plane, the coordinate of Z direction may represent the position of the third dimension of the 2D map. The 2D map may be the image of the X-Z coordinate plane or the Y-Z coordinate plane. If the first localization image and the second localization image are the images of the X-Z coordinate plane, the coordinate of Y direction may represent the position of the third dimension of the 2D map. The 2D map may be the image of the X-Y coordinate plane or the Y-Z coordinate plane. If the first localization image and the second localization image are the images of the Y-Z coordinate plane, the coordinate of X direction may represent the position of the third dimension of the 2D map. The 2D map may be the image of the X-Y coordinate plane or the X-Z coordinate plane.

In some embodiments, the processing device may construct the 3D model based on the space positions of the plurality of pairs of markers. For example, the visualized data determination module 508 may determine the 3D model by connecting the space positions corresponding to the plurality of pairs of markers. The 3D model may represent the space shape of the ROI (e.g., the suspected lesion region). In some embodiments, the 3D surface of the 3D model may be a mesh surface. The mesh surface may include a plurality of grids. In some embodiments, the processing device may display, through a display device, the space positions of the plurality of pairs of markers on the 3D model. The user may intuitively observe the position distribution of the suspected lesion points based on the displayed space positions. More descriptions regarding the determination of 3D model may be found in the present disclosure (e.g., FIG. 7, and the descriptions thereof).

In some embodiments, the processing device may determine the 2D map based on the space positions of the plurality of pairs of markers. In some embodiments, the 2D map may be a 2D scatter distribution map. A scatter point may denote a suspected lesion point corresponding to the pair of markers. The coordinate of the scatter point may denote the position of the suspected lesion point at the third dimension and the first dimension, or at the third dimension and the second dimension. Merely by way of example, if first localization image and the second localization image are the images of the X-Y coordinate plane, the visualized data determination module 508 may extract the coordinate of the first dimension (e.g., X coordinate) or the second dimension (e.g., Y coordinate) of the space position, and extract the third dimension (e.g., Z coordinate) of the space position. The visualized data determination module 508 may construct the 2D map based on the Z coordinate and X or Y coordinate of each space position. The 2D map may relate to position distributions regarding X-Z coordinate plane or Y-Z coordinate plane. More descriptions of the determination of 2D map may be found elsewhere in the present disclosure (e.g., FIG. 8, and the descriptions thereof).

In 610, the processing device (e.g., the target point determination module 510 of the processing device 240) may determine the target point for the needle biopsy based on the visualized data. In some embodiments, the processing device may determine one or more candidate points based on the visualized data. The processing device may select the target point from the one or more candidate points.

In some embodiments, the target point determination module 510 may determine the one or more candidate points according to the 3D model. The 3D model may intuitively display the ROI region (including the suspect lesion region). The one or more candidate points may be determined according to the shape of the 3D model. Specifically, a contour of the suspect lesion region may be segmented from the 3D model. The target point determination module 510 may determine the one or more candidate points based on the contour of the suspect lesion region. For example, the one or more candidate points may include a center point, a plurality of points surrounded the center point. A suitable candidate point may be selected as the target point. For example, the center point of the contour may be selected as the target point.

In some embodiments, the user may select the one or more candidate points manually on the 3D model, and select the target point from the one or more candidate points based on her/his experience. In some embodiments, the target point determination module 510 may determine a geometrical center of the suspected lesion region based on the 3D model, and directly select the geometrical center as the target point.

In some embodiments, the processing device may determine the one or more candidate points on the 2D map. For example, the target point determination module 510 may determine the one or more candidate points based on a Gaussian distribution or a random distribution on the 2D map. The target determination module 510 may select the target point from the one or more candidate points. The target point may be a center point of a cluster of the one or more candidate points. In some embodiments, the user may select the one or more candidate points manually on the 2D map, and select the target point from the one or more candidate points based on her/his experience.

The target point may be designated as a sampling location of the needle biopsy. At the location of the target point, some sample cells or tissues may be extracted by the needle biopsy device. As described above, the target point for the needle biopsy may be accurately determined based on the 3D model or the 2D map, which may improve the diagnosis efficiency for some diseases (e.g., the breast disease).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operations 606 and 608 may be integrated into a single operation.

Figure 7:
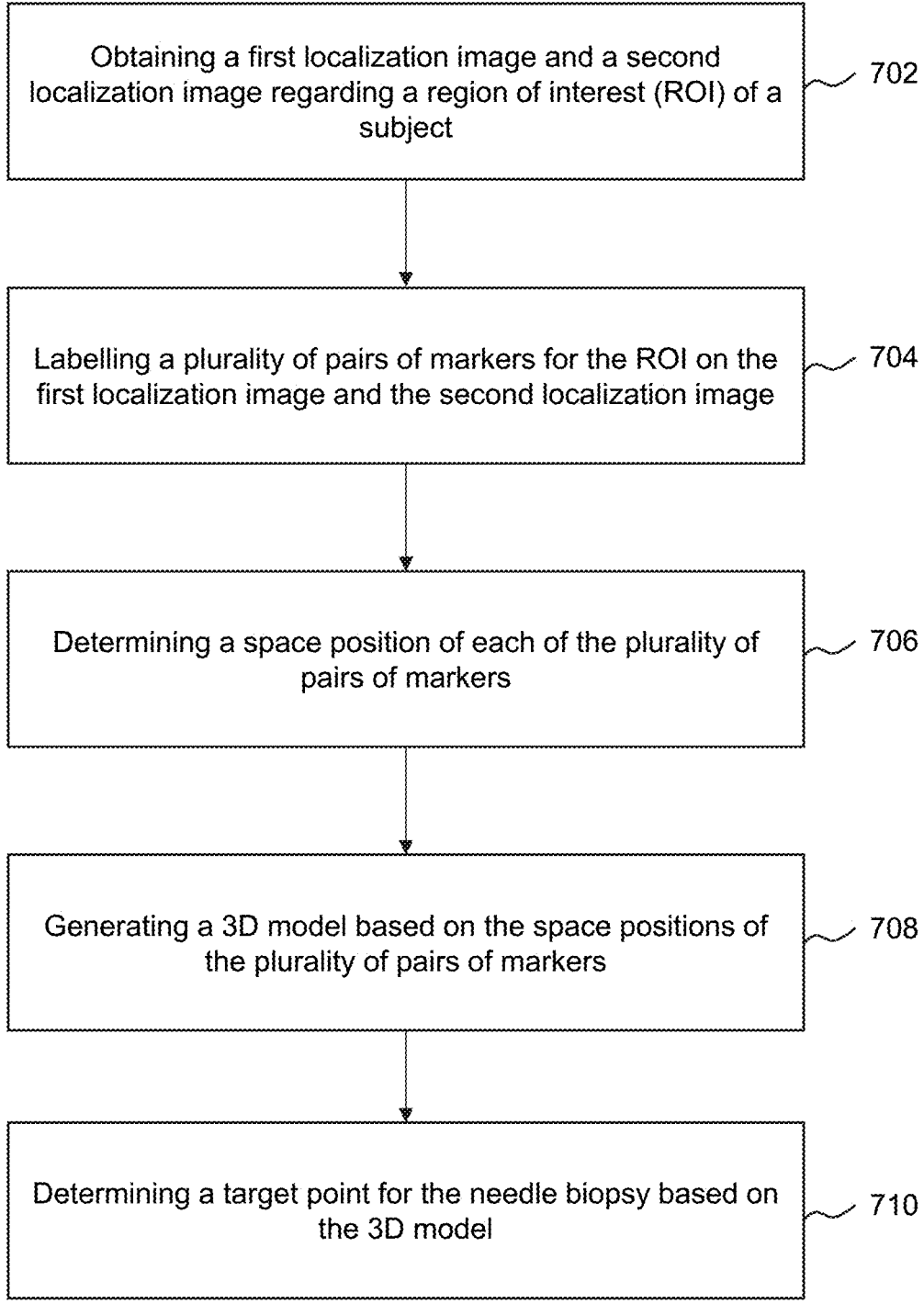
FIG. 7 is a flowchart illustrating an exemplary process for determining a target point for a needle biopsy according to some embodiments of the present disclosure.

FIG. 7 is a flowchart illustrating an exemplary process for determining a target point for a needle biopsy according to some embodiments of the present disclosure. In some embodiments, process 700 may be implemented in the medical system 100 illustrated in FIG. 1 and/or the imaging system 200 illustrated in FIG. 2. For example, the process 700 may be stored in a storage device (e.g., the storage device 250, or the storage 320) as a form of instructions, and can be invoked and/or executed by the processing device 240 (e.g., the processor 310 of the computing device 300, or one or more modules in the processing device 240 illustrated in FIG. 5). The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 702, the processing device (e.g., the acquisition module 502 of the processing device 240) may obtain a first localization image and a second localization image regarding a region of interest (ROI) of a subject). In some embodiments, the subject may be a patient. The ROI of the subject may include a suspect lesion region of the subject. For example, for a patient with a breast disease, the ROI may be the mammary region of the patient. In some embodiments, the first localization image and the second localization image may be acquired by an imaging device (e.g., the imaging device 210). For example, the imaging device 210 may acquire the first localization image at a first acquisition angle (e.g., +15°), and acquire the second localization image at a second acquisition angle (e.g., −15°). The acquisition module 502 may obtain the first localization image and the second localization acquired by the image device 210. In some embodiments, the first localization image and the second localization image may include the imaged ROI region of the subject. In some embodiments, the first localization image and the second localization image may be 2D planar image. In some embodiments, a coordinate system (X, Y, Z) of the gantry of the imaging system may be as a reference coordinate system of the imaging system. If the first localization image and the second localization image may be imaged at X and Y directions, the first localization image and the second localization image may be designated as images of the X-Y coordinate plane. If the first localization image and the second localization image may be imaged at X and Z directions, the first localization image and the second localization image may be designated as images of the X-Z coordinate plane. If the first localization image and the second localization image may be imaged at Y and Z directions, the first localization image and the second localization image may be designated as images of the Y-Z coordinate plane images.

In 704, the processing device (e.g., the label module 504 of the processing device 240) may label a plurality of pairs of markers for the ROI on the first localization image and the second localization image. For each pair of markers, a first marker of the pair of markers may correspond to the first localization image and a second marker of the pair of markers may correspond to the second localization image. In some embodiments, the first marker and the second marker may be labelled on the same corresponding point (e.g., a suspected lesion point) of the ROI of the first localization image and the second localization image, respectively. The first marker and the second marker may correspond to a common space position of the same point of the ROI. In some embodiments, coordinates of the plurality of pairs of markers may be recorded by the processing device.

In 706, the processing device (e.g., the space position determination module 506 of the processing device 240) may determine a space position of each of the plurality of pairs of markers. In some embodiments, the processing device may obtain a first coordinate of the radiation source corresponding to the first localization image, and obtain a second coordinate of the radiation source corresponding to the second localization image. The processing device may obtain image coordinates of each of the plurality of pairs of markers on the first localization image and the second localization image. The processing device may determine, based on the first coordinate, the second coordinate and the images coordinates, the space position of each of the plurality of pairs of markers by using a four-point connection-based localization algorithm. It should be noted that the plurality of pairs of markers each corresponds to a space position.

Operations 702-706 may be similar to or the same as operations 602-606. More details regarding the operations 702-706 may be described in connection with the operations 602-606, and not be repeated herein.

In 708, the processing device (e.g., the visualized data determination module 508 of the processing device 240) may generate a 3D model based on the space positions of the plurality of pairs of markers.

In some embodiments, the space positions of at least a part of the plurality of pairs of markers may be associated with suspected lesion points. These space positions may represent the locations of the suspected lesion points. The processing device may connect, based on the determined space positions, the suspected lesion points to form the 3D model. The 3D model may visually represent the suspected lesion region constructed by the suspected lesion points. In some embodiments, the 3D surface of the 3D model may be a mesh surface. The mesh surface may include a plurality of grids.

Merely for illustration, the visualized data determination module 508 may classify the space positions of the plurality of pairs of markers into multiple layers (e.g., N layers) along the Z coordinate direction. A thickness of each layer may be set as M. The visualized data determination module 508 may construct an envelope line by fitting points on each layer. The visualized data determination module 508 may determine a volume by spreading the envelope line based on the thickness of the layer. Multiple volumes corresponding to the multiple layers may be determined. The entire 3D model may be constructed by the multiple volumes corresponding to the multiple layers.

As another example, the visualized data determination module 508 may determine projection points on the X-Y coordinate plane for the space positions of the plurality of pairs of markers. In some embodiments, Z coordinate value of each projection points may be recorded. In some embodiments, the visualized data determination module 508 may enclose the projection points with a minimum area rectangle on the X-Y coordinate plane. The visualized data determination module 508 may generate a plurality of grids on the surface of rectangle. In some embodiments, each grid may have equal area. For the projection points within each grid, the visualized data determination module 508 may obtain a first projection point having a maximum Z coordinate value and a second projection having a minimum Z coordinate value. The visualized data determination module 508 may generate a first surface by fitting the first projection points, and a second surface by fitting the second projection points. The visualized data determination module 508 may determine the entire 3D model based on the first surface and the second surface. For example, the 3D model may be a 3D volume enclosed by the first surface and the second surface.

As a further example, the visualized data determination module 508 may directly construct, based on the space positions of the plurality of pairs of markers, 3-dimension envelope using a convhulln function. The visualized data determination module 508 may determine the 3D model based on the 3-dimension envelop. Specifically, the volume enclosed by the 3-dimension envelop may be designated as the volume of the 3D model.

In 710, the processing device (e.g., the target point determination module 510 of the processing device 240) may determine a target point for the needle biopsy based on the 3D model.

In some embodiments, using the 3D model, the user (e.g., the operator or the doctor) may comprehensively consider the space positions of the plurality of pairs of markers associated with the suspected lesion region and position information of the suspected lesion region in a coordinate plane. The user may further determine the target point, for example, according to her/his experience.

In some embodiments, the processing device may determine one or more candidate points on the 3D model. The one or more candidate points may be displayed on the 3D model. For example, the one or more candidate points may displayed as red color. The processing device may determine the target point from the one or more candidate points. The target point may be displayed as green color different from other candidate points.

In some embodiments, the target point may be selected manually. Specifically, the user may label the one or more candidate points on the 3D model via an auxiliary tool according to her/his experience. The user may select the target point from the one or more candidate points. In some embodiments, a geometrical center of a cluster of the one or more candidate points may be selected as the target point.

In some embodiments, the target point may be selected automatically. For example, the target point determination module 510 may segment a contour of the suspected lesion region on the 3D model. The target point determination module 510 may determine the one or more candidate points based on the contour of the suspected lesion region. For example, the one or more candidate points may include a center point of the contour and a plurality of points surrounded the center point. The target point determination module 510 may automatically select the center point of the contour as the target point.

FIG. 8 is a flowchart illustrating an exemplary process for determining a target point for a needle biopsy according to some embodiments of the present disclosure. In some embodiments, process 800 may be implemented in the medical system 100 illustrated in FIG. 1 and/or the imaging system 200 illustrated in FIG. 2. For example, the process 800 may be stored in a storage device (e.g., the storage device 250, or the storage 320) as a form of instructions, and can be invoked and/or executed by the processing device 240 (e.g., the processor 310 of the computing device 300, or one or more modules in the processing device 240 illustrated in FIG. 5). The operations of the illustrated process 800 presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting.

In 802, the processing device (e.g., the acquisition module 502 of the processing device 240) may obtain a first localization image and a second localization image regarding a region of interest (ROI) of a subject). In some embodiments, the subject may be a patient. The ROI of the subject may include a suspect lesion region of the subject. For example, for a patient with a breast disease, the ROI may be the mammary region of the patient. In some embodiments, the first localization image and the second localization image may be acquired by an imaging device (e.g., the imaging device 210). For example, the imaging device 210 may acquire the first localization image at a first acquisition angle (e.g., +15°), and acquire the second localization image at a second acquisition angle (e.g., −15°). The acquisition module 502 may obtain the first localization image and the second localization acquired by the image device 210. In some embodiments, the first localization image and the second localization image may include the imaged ROI region of the subject. In some embodiments, the first localization image and the second localization image may be 2D planar image. In some embodiments, a coordinate system (X, Y, Z) of the gantry of the imaging system may be as a reference coordinate system of the imaging system. If the first localization image and the second localization image may be imaged at X and Y directions, the first localization image and the second localization image may be designated as images of the X-Y coordinate plane. If the first localization image and the second localization image may be imaged at X and Z directions, the first localization image and the second localization image may be designated as images of the X-Z coordinate plane. If the first localization image and the second localization image may be imaged at Y and Z directions, the first localization image and the second localization image may be designated as images of the Y-Z coordinate plane images.

In 804, the processing device (e.g., the label module 504 of the processing device 240) may label a plurality of pairs of markers for the ROI on the first localization image and the second localization image. For each pair of markers, a first marker of the pair of markers may correspond to the first localization image and a second marker of the pair of markers may correspond to the second localization image. In some embodiments, the first marker and the second marker may be labelled on the same corresponding point (e.g., a suspected lesion point) of the ROI of the first localization image and the second localization image, respectively. The first marker and the second marker may correspond to a common space position of the same point of the ROI. In some embodiments, coordinates of the plurality of pairs of markers may be recorded by the processing device.

In 806, the processing device (e.g., the space position determination module 506 of the processing device 240) may determine a space position of each of the plurality of pairs of markers. In some embodiments, the processing device may obtain a first coordinate of the radiation source corresponding to the first localization image, and obtain a second coordinate of the radiation source corresponding to the second localization image. The processing device may obtain image coordinates of each of the plurality of pairs of markers on the first localization image and the second localization image. The processing device may determine, based on the first coordinate, the second coordinate and the images coordinates, the space position of each of the plurality of pairs of markers by using a four-point connection-based localization algorithm. It should be noted that the plurality of pairs of markers each corresponds to a space position.

Operations 802-806 may be similar to or the same as operations 602-606 or operations 702-706. More details regarding the operations 802-806 may be described in connection with the operations 602-606 or the operations 702-706, and not be repeated herein.

In 808, the processing device (e.g., the visualized data determination module 508 of the processing device 240) may generate a 2D map based on the space positions of the plurality of pairs of markers. As described in connection with operation 802, the first localization image and the second localization image may be the planar image including two dimensions (e.g., a first dimension and a second dimension). In some embodiments, the generated 2D map may include position information (e.g., coordinates) regarding at least one of the two dimensions of the localization image and a third dimension. In other words, the 2D map may be associated with the first dimension and the third dimension, or the second dimension and the third dimension.

Merely by way of example, if the first localization image and the second localization image are the images of the X-Y coordinate plane, the coordinate of Z direction may represent the position of the third dimension of the 2D map. If the first localization image and the second localization image are the images of the X-Z coordinate plane, the coordinate of Y direction may represent the position of the third dimension of the 2D map. If the first localization image and the second localization image are the images of the Y-Z coordinate plane, the coordinate of X direction may represent the position of the third dimension of the 2D map.

It should be noted that the space position may be represented as a 3-dimension coordinate (X, Y, Z). Merely for illustration, if first localization image and the second localization image are the images of the X-Y coordinate plane, the visualized data determination module 508 may extract the coordinate of the first dimension (e.g., X coordinate) or the second dimension (e.g., Y coordinate) of the space position, and extract the third dimension (e.g., Z coordinate) of the space position. The visualized data determination module 508 may construct the 2D map based on the Z coordinate and X or Y coordinate of each space position. The 2D map may relate to position distributions regarding X-Z coordinate plane or Y-Z coordinate plane.

In 810, the processing device (e.g., the target point determination module 510 of the processing device 240) may determine a target point for the needle biopsy based on the 2D map.

In some embodiments, using the 2D map, the user (e.g., the operator or the doctor) may comprehensively consider the position distribution of the plurality of pairs of markers associated with the suspected lesion region and position information of the suspected lesion region in a coordinate plane. The user may further determine the target point, for example, according to her/his experience.

In some embodiments, the processing device may automatically determine one or more candidate points on the 2D map. For example, the target point determination module 510 may determine the one or more candidate points based on a Gaussian distribution or a random distribution on the 2D map. The target point determination module 510 may select the target point from the one or more candidate points. For example, the target point may be a center point of a cluster of the one or more candidate points. The one or more candidate points may be displayed on the 2D map. The one or more candidate points may displayed as red color. The processing device may determine the target point from the one or more candidate points. The target point may be displayed as green color different from other candidate points. It should be noted that the display form of the candidate point and the target point may be not intended to limit.

In some embodiments, the processing device may display, on the 2D map adjustment information between the candidate point and the target point. The adjustment information may include an adjustment angle and an adjustment amplitude. The candidate point may be adjusted to the target point based on the adjustment information. For example, the candidate point may be adjusted based on the adjustment angle and/or the adjustment amplitude.

Figure 9:
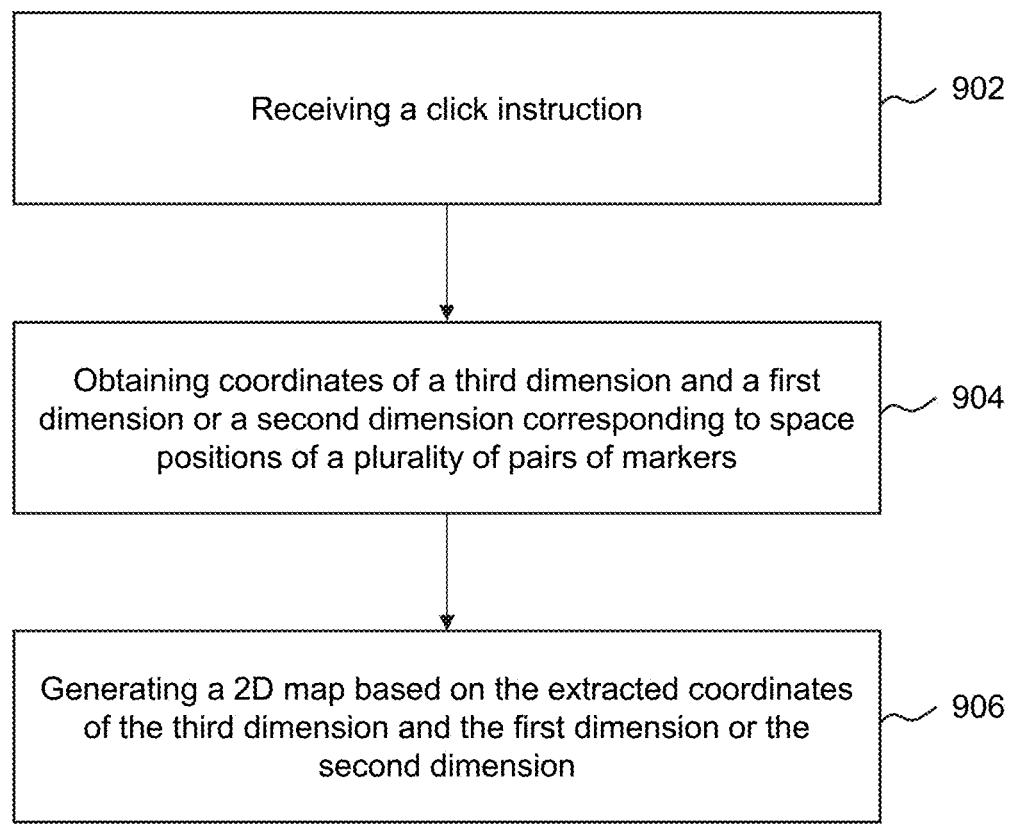
FIG. 9 is a flowchart illustrating an exemplary process for determining a 2D map according to some embodiments of the present disclosure.
Figure 9:
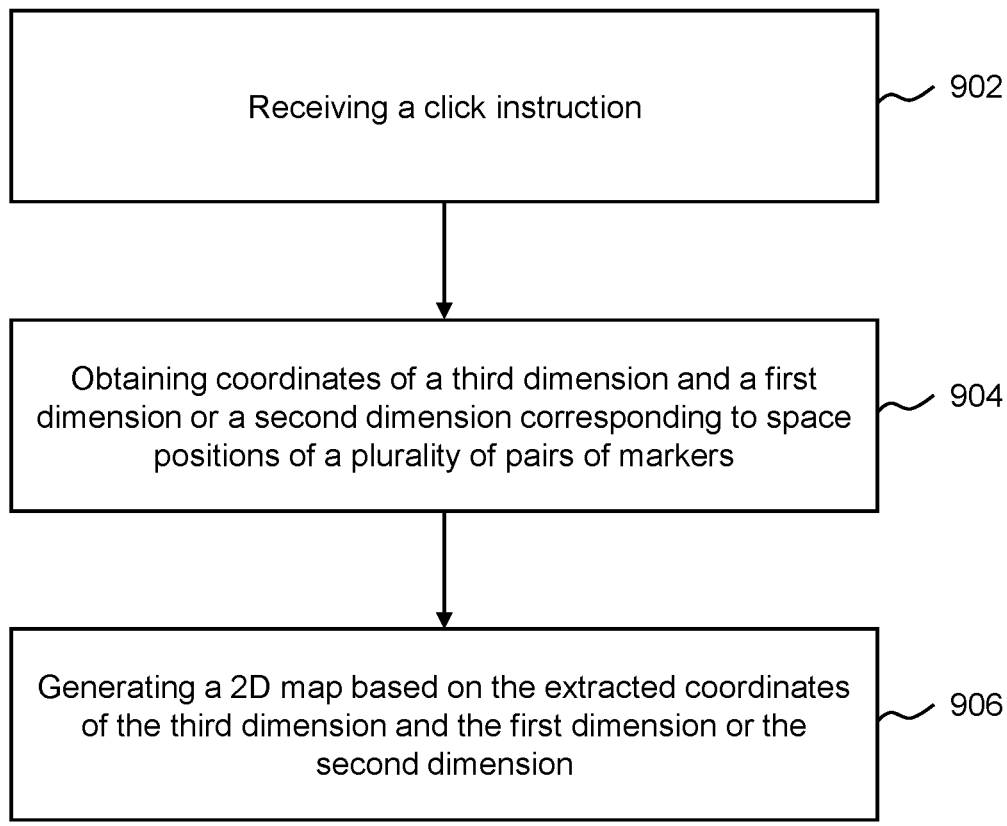
Figure 10:
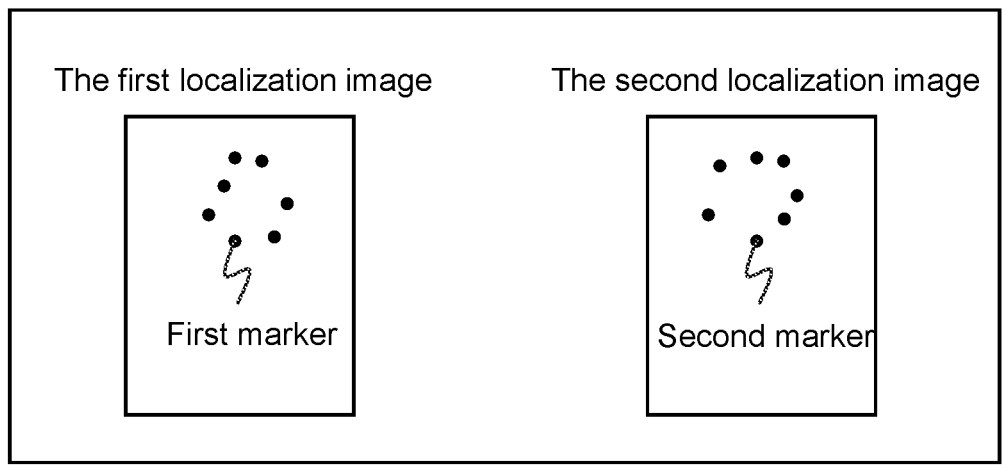
FIG. 10 is a schematic diagram illustrating a plurality of exemplary pairs of markers according to some embodiments of the present disclosure.

FIG. 9 is a flowchart illustrating an exemplary process for generating a 2D map according to some embodiments of the present disclosure.

In 902, the processing device may receive a click instruction on an auxiliary tool. Specifically, the processing device receives the click instruction on the user interface (UI) of the auxiliary tool. The auxiliary tool may be a software or an application for controlling the imaging system.

In 904, in response to the click instruction, the processing device may obtain coordinates of a third dimension and a first dimension or a second dimension corresponding to space positions of a plurality of pairs of markers. The space position may be represented as a 3-dimension coordinate (X, Y, Z). In some embodiments, if the first localization image and the second localization image are the images of the X-Y coordinate plane, the processing device may extract the coordinate of the first dimension (e.g., X coordinate) or the second dimension (e.g., Y coordinate) of the space position, and extract the third dimension (e.g., Z coordinate) of the space position. In some embodiments, if the first localization image and the second localization image are the images of the X-Z coordinate plane, the processing device may extract the coordinate of the first dimension (e.g., X coordinate) or the second dimension (e.g., Z coordinate) of the space position, and extract the third dimension (e.g., Y coordinate) of the space position. In some embodiments, if the first localization image and the second localization image are the images of the Y-Z coordinate plane, the processing device may extract the coordinate of the first dimension (e.g., Y coordinate) or the second dimension (e.g., Z coordinate) of the space position, and extract the coordinate of third dimension (e.g., X coordinate) of the space position.

In 906, the processing device may generate a 2D map based on the extracted coordinates of the third dimension and the first dimension or the second dimension. For example, the processing device may construct the 2D map based on the Z coordinate and X coordinate or Y coordinate of each space position. The 2D map may represent position distributions regarding X-Z coordinate plane or Y-Z coordinate plane. As another example, the processing device may construct the 2D map based on the Y coordinate and X coordinate or Z coordinate of each space position. The 2D map may represent position distributions regarding X-Y coordinate plane or Y-Z coordinate plane. As a further example, the processing device may construct the 2D map based on the X coordinate and Y coordinate or Z coordinate of each space position. The 2D map may represent position distributions regarding X-Y coordinate plane or X-Z coordinate plane.

In some embodiments, a non-transitory computer readable medium may be provided as one embodiment of the present disclosure. The non-transitory computer readable medium may comprise at least one set of instructions for determining a target point for a needle biopsy. When executed by one or more processors of a computing device, the at least one set of instructions causes the computing device to perform one or more operations as follows. The one or more processors may obtain a first localization image and a second localization image regarding a region of interest (ROI) of a subject. The one or more processors may label a plurality of pairs of markers for the ROI on the first localization image and the second localization image. The one or more processors may generate visualized data regarding the ROI based on the space positions of the plurality of pairs of markers. The one or more processors may determine the target point for the needle biopsy based on the visualized data. The target point may be designated as a sampling location of the needle biopsy. At the location of the target point, some sample cells or tissues may be extracted by the needle biopsy device. The target point for the needle biopsy may be accurately determined based on the 3D model or the 2D map, which may improve the diagnosis efficiency for some diseases (e.g., the breast disease).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for determining a target point for a needle biopsy, comprising:
    obtaining, by at least one processor, a first localization image and a second localization image regarding a region of interest (ROI) of a subject generated by an imaging device, wherein the ROI of the subject includes a suspect lesion region of the subject, the first localization image and the second localization image are different images, the first localization image includes image information indicative of the suspect lesion region at a first acquisition angle, and the second localization image includes image information indicative of the same suspect lesion region at a second acquisition angle different from the first acquisition angle;
    determining, by the at least one processor, a first projection coordinate of the ROI on the first localization image and a second projection coordinate of the ROI on the second localization image;
    determining, by the at least one processor, a space position of the ROI based on a first coordinate of a radiation source corresponding to the first localization image, a second coordinate of the radiation source corresponding to the second localization image, the first projection coordinate of the ROI on the first localization image, and the second projection coordinate of the ROI on the second localization image, the space position being represented as a three-dimensional (3D) coordinate corresponding to three different dimensions of a first dimension, a second dimension, and a third dimension, the first dimension, the second dimension, and the third dimension are vertical to each other;
    generating, by the at least one processor, visualized data regarding the ROI based on the space position of the ROI, wherein the first localization image and the second localization image are two-dimensional (2D) images corresponding to the first dimension and the second dimension, the visualized data is a 2D map, and the 2D map is a 2D image presenting position information of the suspected lesion region in a coordinate plane corresponding to the first dimension and the third dimension, or a 2D image presenting position information of the suspected lesion region in a coordinate plane corresponding to the second dimension and the third dimension; and
    determining, by the at least one processor, the target point for the needle biopsy on the 2D map.

2. The method of claim 1, wherein the first acquisition angle and the second acquisition angle have an equal absolute deflection angle value but opposite deflection directions from a reference location.

3. The method of claim 2, further comprising:
    before acquiring the first localization image and the second localization image,
        obtaining an initial localization image at an initial acquisition angle using the imaging device; and
        determining whether the ROI is within an imaging range of the imaging device.

4. The method of claim 3, wherein a first difference between the initial acquisition angle and the first acquisition angle is equal to a second difference between the initial acquisition angle and the second acquisition angle.

5. The method of claim 1, wherein the determining, by the at least one processor, the target point for the needle biopsy on the 2D map further includes:
    determining at least two candidate points based on the visualized data; and
    selecting the target point from the at least two candidate points.

6. The method of claim 1, wherein the ROI includes a mammary region of the subject.

7. The method of claim 1, wherein the generating, by the at least one processor, the visualized data regarding the ROI based on the space position of the ROI comprises:
    extracting a first coordinate of the first dimension or the second dimension of the space position;
    extracting a second coordinate of the third dimension of the space position; and
    constructing the 2D map based on the first coordinate and the second coordinate of the space position.

8. The method of claim 1, wherein the determining, by the at least one processor, the target point for the needle biopsy on the 2D map further includes:
    determining one or more candidate points based on a Gaussian distribution or a random distribution on the 2D map; and
    selecting the target point from the one or more candidate points, the target point is a center point of a cluster of the one or more candidate points.

9. The method of claim 1, wherein the determining, by the at least one processor, the target point for the needle biopsy on the 2D map further includes:
    selecting one or more candidate points manually on the 2D map;
    selecting the target point from the one or more candidate points manually.

10. The method of claim 1, wherein the target point is displayed as a first color different from a second color of other candidate points.

11. The method of claim 1, wherein the 2D map is a 2D scatter distribution image, and the 2D map presents a position distribution of suspected lesion points of the suspect lesion region on the coordinate plane corresponding to the first dimension and the third dimension, or the coordinate plane corresponding to the second dimension and the third dimension.

12. A system for determining a target point for a needle biopsy, comprising:
at least one storage device including a set of instructions; and
at least one processor in communication with the at least one storage device, wherein when executing the set of instructions, the at least one processor is directed to cause the system to:
obtain a first localization image and a second localization image regarding a region of interest (ROI) of a subject generated by an imaging device, wherein the ROI of the subject includes a suspect lesion region of the subject, the first localization image and the second localization image are different images, the first localization image includes image information indicative of the suspect lesion region at a first acquisition angle, and the second localization image includes image information indicative of the same suspect lesion region at a second acquisition angle different from the first acquisition angle;
determine first projection coordinates of points of the ROI on the first localization image and second projection coordinates of the points of the ROI on the second localization image;
determine space positions of the points of the ROI based on a first coordinate of a radiation source corresponding to the first localization image, a second coordinate of the radiation source corresponding to the second localization image, the first projection coordinates of the points of the ROI on the first localization image, and the second projection coordinates of the points of the ROI on the second localization image, the space positions being represented as three-dimensional (3D) coordinates corresponding to three different dimensions of a first dimension, a second dimension, and a third dimension;
generate visualized data regarding the ROI based on the space positions of the points of the ROI, including:
determining a projection of the space positions of the points of the ROI on a two-dimensional (2D) coordinate plane of the first dimension and the second dimension;
enclosing the projection with a minimum area rectangle on the 2D coordinate plane;
generating a plurality of grids on a surface of rectangle;
for the projection within each grid, obtaining a first projection having a maximum coordinate value of the third dimension and a second projection having a minimum coordinate value of the third dimension;
generating a first surface by fitting the first projection, and a second surface by fitting the second projection; and
constructing a 3D model based on a 3D volume enclosed by the first surface and the second surface;
wherein the visualized data is represented by the three-dimensional (3D) model and the 3D model represents a space shape of the ROI; and
determine the target point for the needle biopsy based on the visualized data.

13. The system of claim 12, wherein the at least one processor is further directed to cause the system to:
display the space positions of the points of the ROI on the 3D model.

14. The system of claim 12, wherein to determine the target point for the needle biopsy based on the visualized data, the at least one processor is further directed to cause the system to:
determine at least two candidate points based on the visualized data; and
select the target point from the at least two candidate points.

15. The system of claim 12, wherein to generate visualized data regarding the ROI based on the space positions of the points of the ROI, the at least one processor is directed to cause the system to:
classify the space positions of the points of the ROI into multiple layers along a coordinate direction of one of the three dimensions;
construct an envelope line by fitting the points on each layer;
for each layer, determine a volume by spreading the envelope line based on a thickness of the layer; and
construct the 3D model based on the multiple volumes corresponding to the multiple layers.

16. The system of claim 12, wherein to generate visualized data regarding the ROI based on the space positions of the points of the ROI, the at least one processor is directed to cause the system to:
construct, based on the space positions of the points of the ROI, a 3D envelope using a convhulln function; and
construct the 3D model based on the 3D envelope.

17. A non-transitory computer readable medium, comprising at least one set of instructions for determining a target point for a needle biopsy, wherein when executed by one or more processors of a computing device, the at least one set of instructions causes the computing device to perform a method, the method comprising:
obtaining a first localization image and a second localization image regarding a region of interest (ROI) of a subject generated via an imaging device, wherein the ROI of the subject includes a suspect lesion region of the subject, the first localization image and the second localization image are different images, the first localization image includes image information indicative of the suspect lesion region at a first acquisition angle, and the second localization image includes image information indicative of the same suspect lesion region at a second acquisition angle different from the first acquisition angle;
determining a first projection coordinate of the ROI on the first localization image and a second projection coordinate of the ROI on the second localization image;
determining a space position of the ROI based on a first coordinate of a radiation source corresponding to the first localization image, a second coordinate of the radiation source corresponding to the second localization image, the first projection coordinate of the ROI on the first localization image, and the second projection coordinate of the ROI on the second localization image, the space position being represented as a three-dimensional (3D) coordinate corresponding to three different dimensions of a first dimension, a second dimension, and a third dimension, the first dimension, the second dimension, and the third dimension are vertical to each other;
generating visualized data regarding the ROI based on the space position of the ROI, wherein the first localization image and the second localization image are two-dimensional (2D) images corresponding to the first dimension and the second dimension, the visualized data is a 2D map corresponding to a third dimension and the first dimension, or corresponding to the third dimension and the second dimension, the third dimension is different from the first dimension and the second dimension, wherein the generating visualized data regarding the ROI based on the space position of the ROI includes:

extracting, from the 3D coordinate of the space position, a third coordinate of the first dimension or the second dimension of the space position;

extracting, from the 3D coordinate of the space position, a fourth coordinate of the third dimension of the space position; and constructing the 2D map based on the third coordinate and the fourth coordinate of the space position; and determining the target point for the needle biopsy on the 2D map.

* * * * *